(12) United States Patent
Krehbiel et al.

(10) Patent No.: US 7,770,651 B2
(45) Date of Patent: Aug. 10, 2010

(54) METHOD AND APPARATUS FOR SUB-SEA PROCESSING

(75) Inventors: Drew Linden Krehbiel, Richmond, TX (US); Richard D'Souza, Houston, TX (US)

(73) Assignee: Kellogg Brown & Root LLC, Houston, TX (US)

( * ) Notice: Subject to any disclaimer, the term of this patent is extended or adjusted under 35 U.S.C. 154(b) by 0 days.

(21) Appl. No.: 11/674,377

(22) Filed: Feb. 13, 2007

(65) Prior Publication Data

US 2008/0190291 A1    Aug. 14, 2008

(51) Int. Cl.
   *E21B 43/36* (2006.01)
(52) U.S. Cl. ............ 166/357; 166/344; 166/356
(58) Field of Classification Search ........... 166/357, 166/344, 356, 360, 368
   See application file for complete search history.

(56) References Cited

U.S. PATENT DOCUMENTS

| | | | | |
|---|---|---|---|---|
| 3,651,617 A * | 3/1972 | Hodgson | ...... | 95/188 |
| 4,174,000 A * | 11/1979 | Milberger | ...... | 166/363 |
| 4,323,118 A * | 4/1982 | Bergmann | ...... | 166/96.1 |
| 4,352,376 A * | 10/1982 | Norwood | ...... | 137/624.15 |
| 4,948,393 A * | 8/1990 | Hodson et al. | ...... | 95/250 |
| 5,021,232 A * | 6/1991 | Hise et al. | ...... | 423/574.1 |
| 5,050,680 A * | 9/1991 | Diehl et al. | ...... | 166/356 |
| 5,302,294 A * | 4/1994 | Schubert et al. | ...... | 210/702 |
| 5,382,141 A * | 1/1995 | Stinessen | ...... | 417/423.8 |
| 5,398,762 A * | 3/1995 | Stinessen | ...... | 166/356 |
| 5,477,924 A * | 12/1995 | Pollack | ...... | 166/357 |
| 6,003,603 A * | 12/1999 | Breivik et al. | ...... | 166/357 |
| 6,046,685 A * | 4/2000 | Tubel | ...... | 340/853.2 |
| 6,197,095 B1 * | 3/2001 | Ditria et al. | ...... | 95/248 |
| 6,640,901 B1 * | 11/2003 | Appleford et al. | ...... | 166/357 |
| 7,013,978 B2 * | 3/2006 | Appleford et al. | ...... | 166/357 |
| 7,048,058 B2 * | 5/2006 | Ostergaard | ...... | 166/339 |
| 7,087,157 B2 * | 8/2006 | Spani | ...... | 210/96.1 |
| 7,144,498 B2 * | 12/2006 | McCall et al. | ...... | 208/113 |
| 7,152,682 B2 * | 12/2006 | Hopper | ...... | 166/357 |
| 7,163,636 B2 * | 1/2007 | Spani | ...... | 210/774 |
| 2004/0251030 A1 * | 12/2004 | Appleford et al. | ...... | 166/357 |
| 2005/0145388 A1 * | 7/2005 | Hopper | ...... | 166/357 |
| 2006/0011348 A1 * | 1/2006 | Fenton et al. | ...... | 166/366 |
| 2006/0157251 A1 * | 7/2006 | Stinessen et al. | ...... | 166/357 |
| 2006/0226077 A1 * | 10/2006 | Stark | ...... | 210/637 |
| 2006/0260468 A1 * | 11/2006 | Amin | ...... | 95/153 |
| 2007/0023163 A1 * | 2/2007 | Kidwell et al. | ...... | 165/45 |
| 2007/0131429 A1 * | 6/2007 | Brammer | ...... | 166/357 |

* cited by examiner

*Primary Examiner*—Thomas A Beach
*Assistant Examiner*—Matthew R Buck
(74) *Attorney, Agent, or Firm*—KBR IP Legal

(57) ABSTRACT

A submersible process environment for sub-sea processing is provided. Such environment can include a modular encapsulated unit having an interior volume and one or more processing units disposed therein, a first valve in fluid communication with the interior and exterior of the unit, and a second valve in fluid communication with the interior and exterior of the unit. The first valve and the second valve can be in fluid communication with the processing unit, and the processing unit can receive a fluid from the first valve and discharges the fluid to the second valve.

22 Claims, 5 Drawing Sheets

METHOD AND APPARATUS FOR SUB-SEA PROCESSING

CROSS REFERENCE TO RELATED APPLICATIONS

1. Field

The present embodiments relate to sub-sea processing. More particularly, embodiments of the present invention relate to methods and apparatus for sub-sea processing using encapsulated equipment.

2. Background

Hydrocarbons exploited from off shore wells are typically processed to separate gas from liquid, remove water from the hydrocarbon, and/or remove sulfur. One approach to this processing has been to transfer the hydrocarbon from the well to the shore and use on-shore systems to perform the requisite processing. One disadvantage to on-shore processing of multi-phase fluid is the expense of building pipe-line systems for transferring the hydrocarbon from the well head to the shore, not to mention the problems with erosion, corrosion, and hydrate formation in the pipeline systems.

In recent years, methods and systems have been introduced for performing some of the processes at depth, relatively close to the well heads. Submersible equipment used in deep-sea operations must be designed to withstand the intense pressures and harsh environment found at depth. However, the deeper the exploration, the more complex the equipment tends to be, the harder it is to design, and the more expensive it is to build.

The availability of such suitable sub-sea equipment is limited. For example, very few multi-phase pumps are available that are rated for depths down to about 3,000 feet below sea level. In some cases, equipment is not currently available that can withstand the environments at greater depths.

A need exists for a way to utilize on-shore processing equipment without having to significantly redesign the equipment to perform certain processing at depth, significant cost and complexity issues could be overcome. Currently however, a method or manner to submerge most on-shore equipment and have it work at depth due to current design restraints does not exist.

A need exists, therefore, for a solution to the limitations discussed above

BRIEF DESCRIPTION OF THE DRAWINGS

The detailed description will be better understood in conjunction with the accompanying drawings as follows.

The present embodiments are detailed below with reference to the listed Figures.

DETAILED DESCRIPTION OF THE EMBODIMENTS

Before explaining the present embodiments in detail, it is to be understood that the embodiments are not limited to the particular embodiments and that they can be practiced or carried out in various ways.

Embodiments herein relate to submersible process environments and methods for sub-sea processing. The submersible process environments can be located close to a well head and/or in a location located near two or more well heads to process the contents of the wells. The submersible process environment utilizes surface rated equipment in a closed, contained environment that is suitable to withstand sub-sea depths and associated pressures. In at least one specific embodiment, the submersible process environment includes one or more encapsulated units each having an interior volume and one or more processing units disposed therein. The interior volume provides a self-contained, pressure regulated environment, which can be operated at a significantly less pressure than the surroundings outside of the encapsulated unit. As such, the processing units disposed within the interior volume of the encapsulated unit can be designed and rated for surface design conditions, yet be located at or near a sub-sea well head.

The submersible process environments can include one or more encapsulated units in fluid communication with at least one well head such that the units can perform sub-sea processing of the well contents. In one or more embodiments, the submersible process environment can include two or more encapsulated units in fluid communication with each other, arranged in parallel or series, and in fluid communication with at least one well head such that the units can perform sub-sea processing. For example, the encapsulated units can be located at a sub-sea location and placed in fluid communication with one another to form a processing or treatment system, such as a two phase separation system, three phase separation system, gas dehydration system, thermal conditioning system, and/or sulfur recovery unit. Herein, the term "sub-sea" refers to the volume of water below any and all bodies of water.

Figure 1:
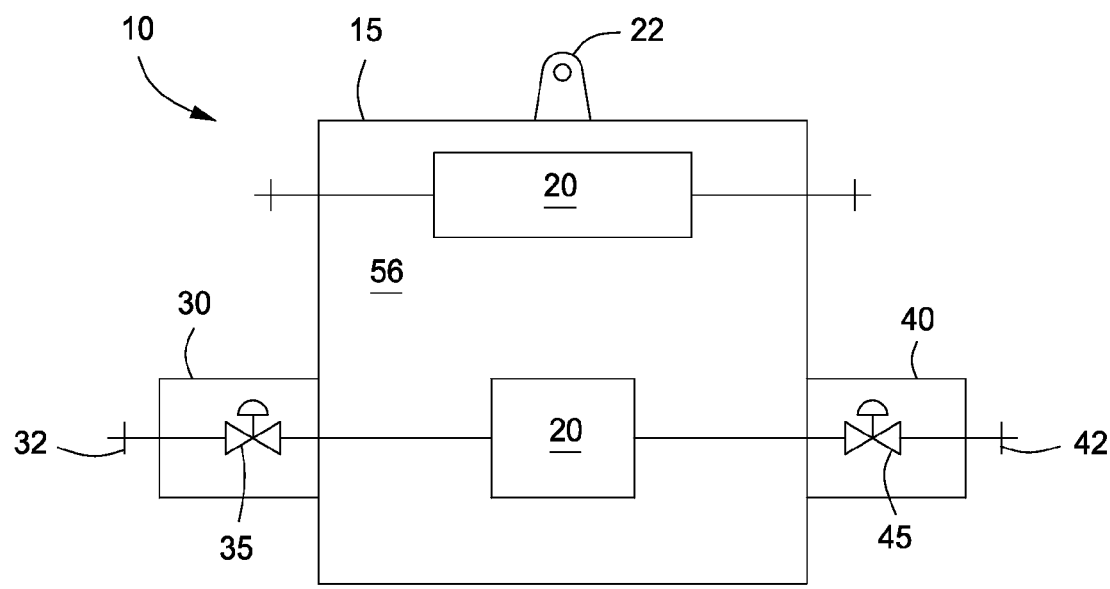
FIG. 1 depicts a schematic of an illustrative submersible process environment for sub-sea processing according to one or more embodiments described.

With reference to the figures, FIG. 1 depicts a schematic of an illustrative submersible process environment for sub-sea processing according to one or more embodiments described. The submersible process environment 10 can include one or more encapsulated units 15. Each encapsulated unit 15 provides a housing for one or more processing units 20. In one or more embodiments, the encapsulated unit 15 has a plenum or interior volume 56 having the one or more processing units 20 disposed therein. The processing units 20 can be a single component or two or more components adapted to process a hydrocarbon, water or any other fluid from the sub-sea well.

The term "processing unit" as used herein refers to any component or piece of equipment for fluid handling, treating, processing, or operating. For example, the processing units 20 can be or include any one or more pumps, compressors, tanks, heat exchangers, hydro-cyclones, sand traps, gas-oil separators, blow-out preventers, umbilical termination assemblies, risers, pipes, tubulars, and valves. As mentioned, the processing units 20 can be rated for surface design conditions yet be located at or near a sub-sea well head.

The encapsulated unit 15 can be made from any suitable material and thickness to withstand external pressures, up to about 12,000 feet. For example, the encapsulated unit 15 can be made from carbon steel, stainless steel, nickel, aluminum, blends thereof and alloys thereof. In one or more embodiments, the encapsulated unit 15 can be made from carbon steel reinforcing beams wrapped by an aluminum skin or some other suitable material.

The encapsulated unit 15 can have any shape and any size, depending on the type, size and number of processing units 20 disposed therein. For example, the encapsulated unit 15 can be shaped to be a rectangular, square, or spherical structure. In one or more embodiments, the encapsulated unit 15 can be tubular or cylindrical with flat or semi-hemispherical heads. In one or more embodiments, the encapsulated unit 15 is a rectangular or square box.

In one or more embodiments, the encapsulated unit 15 can be filled with a blanket gas to reduce condensation and/or prevent corrosion due to moisture or other contamination. For example, the interior volume 56 of the encapsulated unit 15 can be at least partially filled with a blanket gas. The blanket gas can be an inert gas, such as argon, nitrogen or mixtures thereof.

In one or more embodiments, the blanket gas can be added to the encapsulated unit 15 prior to location sub-sea. In one or more embodiments, the blanket gas can be added to the encapsulated unit 15 at location sub-sea. For example, the encapsulated unit 15 can be in fluid communication with one or more conduits, such as a riser, tubing or pipe, that extend to the surface or other system or utilities station. Such conduit(s) can be used to supply and/or regulate the flow or amount of blanket gas to the interior volume 56 of the encapsulated unit 15.

In one or more embodiments, one or more valves can be used to communicate between the interior 56 and exterior of the encapsulated unit 15. For example, one or more firsts valves 35 ("inlet valves") and one or more second valves 45 ("outlet valves" or "discharge valves") can be in fluid communication with the one or more processing units 20 within the interior volume 56 of the encapsulated unit 15, as depicted in FIG. 1. Accordingly, the valves 35, 45 can be used as a high pressure interface between the exterior of the encapsulated unit 15 and the interior volume 56 such that only the valves 35, 45 need to be rated for high pressure service. In operation, the processing units 20 can receive a fluid from the one or more first valves 35 and discharge the fluid to the one or more second valve 45. The direction of fluid flow between the valves 35, 45 and the processing equipment units 20 is not a limitation to the embodiments herein.

To submerge the encapsulated unit 15, the one or more first valves 35 and second valves 45 can be closed, keeping the water external to the internal volume 56 of the encapsulated unit 15. In one or more embodiments, the one or more first valves 35 and second valves 45 are actuated to fail closed such that the processing units 20 never contact the pressures or fluid encountered during submersion. With the valves 35, 45 in a closed position, the processing units 20 within the internal volume 56 of the encapsulated unit 15 are isolated from the surroundings. The encapsulated unit 15 can then be located at a desired depth and location.

In one or more embodiments, the encapsulated unit 15 can include one or more connection members 22 disposed thereon. The one or more connection members 22 can be a hook, latch, handle, or eyelet that can provide a permanent or removable connection with a crane, ROV or diver. The connection member 22 shown in FIG. 1 is depicted as an eyelet.

The encapsulated unit 15 can be modular and two or more encapsulated units 15 can be arranged in series or parallel to perform or at least partially perform a process sub-sea. In one or more embodiments, two or more encapsulated units 15 are arranged in series or parallel. In one or more embodiments, three or more encapsulated units 15 are arranged in series or parallel. In one or more embodiments, four or more encapsulated units 15 are arranged in series or parallel. In one or more embodiments, five or more encapsulated units 15 are arranged in series or parallel.

In one or more embodiments, the encapsulated unit(s) 15 can be submerged in the water, transported to a sub-sea processing location, and placed in fluid communication with one another such that the encapsulated units 15 form a sub-sea processing system or process, or at least a portion thereof, some examples of which are described in more detail below. In one or more embodiments, the encapsulated unit(s) 15 can be assembled using remotely operated vehicles or under sea divers. In one or more embodiments, the encapsulated unit(s) 15 can be assembled at the surface and placed in service as a pre-assembled module.

In one or more embodiments, the encapsulated unit(s) 15 can include a ballasting system (not shown). For example, a ballasting system can include one or more compartments or attachments for permanently or temporarily housing concrete, sand, water, or any combination thereof. In one or more embodiments, the ballasting system can include an internal water tank or one or more cans for holding a fluid, such as air and/or water.

In one or more embodiments, any one or more encapsulated units 15 making up a series of units can be replaced, repaired, moved or removed from service at depth (i.e. at sea), as needed. Any such sub-sea maintenance can be performed using remotely operated vehicles or under sea divers.

To facilitate connections between two or more encapsulated units 15 or to other equipment located at depth, the encapsulated units 15 can include one or more first and second interfaces 32, 42 that are adapted to engage or otherwise connect to one another and/or to the other equipment located at depth. The first and second interfaces 32, 42 can be complementary, matched or otherwise adapted to engage or connect to one another so that the encapsulated units 15 can be connected or arranged in fluid communication. In one or more embodiments, the one or more first interfaces 32 and the one or more second interfaces 42 can be flange mount connections including some type of quick connecting nozzle or latch, for example. In one or more embodiments, the interfaces 32, 42 can be a box and mail type connection. In one or more embodiments, the first interfaces 32 and the second interfaces 42 can be connected or arranged in fluid communication with each other and/or to other equipment located at depth by disposing a fluid transmitting aperture or pipe, not shown, between the interfaces 32, 42 such that the pipe transmits fluid from the first interfaces 32 to the second interfaces 42. In one or more embodiments, the first and second interfaces 32, 42 can be connected by one or more flexible connections, such as flexible hoses, flexible tubing, and any combinations thereof.

Still referring to FIG. 1, the one or more valves 35, 45 can be disposed within one or more auxiliary containers or valve boxes 30, 40 (two are shown). The valve boxes 30, 40 can provide a housing for the one or more valves 35, 45. For example, the valve boxes 30, 40 can provide a housing for the valves 35, 45 to protect them from the environments encountered outside the valve boxes 30, 40 should the need arise to have surface rated valves 35, 45. The valve boxes 30, 40 can also contain leaks from the valve 35, 45 disposed therein in the event of valve failure, rupture, or other upset conditions. In addition, the valve boxes 30, 40 can protect electrical, pneumatic, and other equipment necessary for valve operation. The valve boxes 30, 40 can be disposed on the exterior of the encapsulated units 15, as depicted in FIG. 1, and can be welded or otherwise attached to the encapsulated unit 15.

Figure 2:
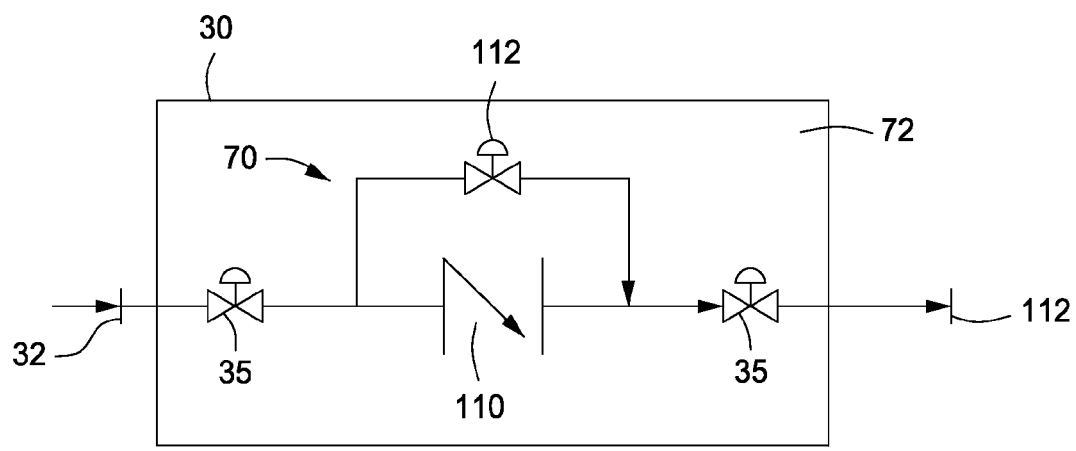
FIG. 2 depicts a schematic of an illustrative encapsulated safety valve circuit according to one or more embodiments described.

FIG. 2 depicts a schematic of an illustrative encapsulated safety valve circuit according to one or more embodiments described. The encapsulated safety valve circuit 70 can be disposed within an interior volume 72 of any one of the one or more valve boxes 30, 40. The encapsulated safety valve circuit 70 can be used to protect the processing units 20 from the pressures and sea-water encountered during transfer to and from a given sub-sea processing location, especially in the event of a valve failure or in the event a valve is inadvertently left open. For simplicity and ease of description, the encapsulated safety valve circuit 70 will be further described with reference to the valve box 30.

In one or more embodiments, the safety valve circuit 70 can include two or more valves 35 arranged in series or parallel. The safety valve circuit 70 can also include one or more check valves 110 and one or more bypass valves 112. In one or more embodiments, the safety valve circuit 70 can be designed to insure that if one of the valves 35 fails open or is left open, another one of the valves will act as a backup to the open valve to prevent sub-sea water and the associated pressures from the sub-sea water from contacting the processing units 20 disposed within the internal volume 56 of the encapsulated unit 15.

In one or more embodiments, the valve box 30 can be filled with an inert gas to reduce condensation and prevent corrosion due to moisture. For example, the interior volume 72 of the valve box 30 can be filled or at least partially filled with argon or nitrogen. It should be noted that safety valve circuit 70 can be in communication with the processing units 20 disposed in the encapsulated unit 15 without being disposed within the valve boxes 30,40.

Referring again to FIG. 1, heat can be generated and contained within the internal volume 56 of the encapsulated unit 15. For example, any one or more of the processing units 20 can be rotating equipment that generate and emit heat. As such, the temperature inside the contained, encapsulated unit 15 can become inhospitable to the other units 20 and fluids disposed therein.

To alleviate this problem, one or more cooling systems can be located within the encapsulated unit 15 or in fluid communication with the internal volume 56 of the encapsulated unit 15 to regulate and control the temperature therein. For example, a heat exchanger, such as a typical shell and tube type, can be used to exchange the thermal energy to or from the atmosphere, protecting the processing units 20 from a thermal environment that is inhospitable to the processing units 20. An air circulation system can also be used to stir the atmosphere inside the encapsulated unit 15. By stirring the atmosphere inside the encapsulated unit 15, the overall convective circulation inside the encapsulated unit 15 can be improved and thus increase the heat transfer efficiency between the atmosphere inside the encapsulated unit 15 and its surroundings. Stirring or otherwise circulating the atmosphere inside the encapsulated unit 15 can also prevent hot spots from developing on the processing units 20 during and after operations.

In one or more embodiments, one or more convective heat paths can be used to transfer energy between the processing units 20 and the structure of the encapsulated unit 15. For example, the processing units 20 can be designed such that a portion of the thermal energy produced by the processing units 20 can be directed to a physical interface between the processing units 20 and the encapsulated unit 15. For example, the encapsulated unit 15 can be designed such that thermal energy from the processing units 20 can be directed along the structure or side walls of the encapsulated unit 15 to the exterior thereof where the energy can be transmitted to the surrounding water.

Figure 3:
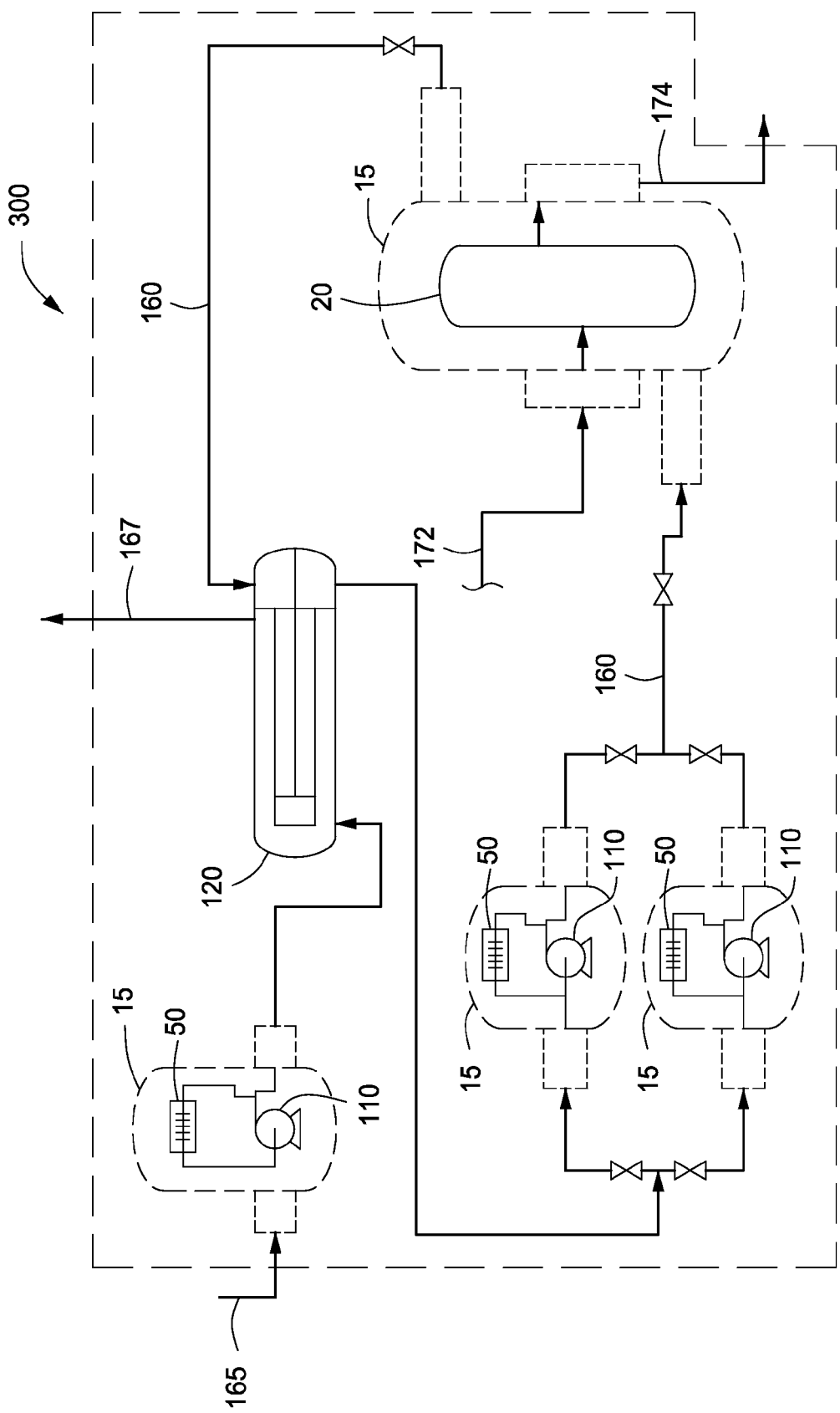
FIG. 3 depicts a schematic of an illustrative submersible process environment for a thermal conditioning processing system that employs one or more encapsulated units according to one or more embodiments described.

FIG. 3 depicts a schematic of an illustrative submersible process environment for a thermal conditioning processing system that employs one or more encapsulated units according to one or more embodiments described. The submersible process environment 300 can include at least one heat exchanger 120 in fluid communication with at least one thermal control loop 160 in fluid communication with a source 165 of heat transfer liquid. The submersible process environment 300 can also include at least three encapsulated units 15, each providing a housing for one or more processing units disposed therein, such as pumps 110. The submersible process environment 300 can also include a fourth encapsulated unit 15 that provides a housing for one or more processing units, such as a vertical vessel 20 as depicted. The heat transfer liquid can be any fluid or gas that can exchange thermal energy with at least the heat exchanger 120 and the fourth encapsulated unit 15. For example, the heat transfer unit can be sea-water, Freon, carbon dioxide, ammonia, or any fluid capable of exchanging thermal energy. Although three pumps 110 are depicted in FIG. 3, the number of pumps in FIG. 3 is not an indication of the minimum or maximum number of pumps that can be employed within the submersible process environment 300.

The thermal control loop 160 can flow a heat transfer liquid from the heat exchanger 120 to the fourth encapsulated unit 15 and back to the heat exchanger 120 thereby creating a loop that can transfer thermal energy between at least the fourth encapsulated unit 15 and the heat exchanger 120. In one or more embodiments, the fourth encapsulated unit 15 can transfer thermal energy between the interior volume of the encapsulated unit 15 and/or the processing unit 20 and the thermal control loop 160, thereby thermally conditioning the processing unit 20. In one or more embodiments, the processing unit 20 can process a hydrocarbon stream from an inlet 172 and discharge the processed hydrocarbon to an outlet 174 while receiving thermal conditioning from the thermal control loop 160.

In one or more embodiments, the thermal energy gained by the heat exchanger 120 from the thermal control loop 160 can be exchanged with the heat transfer liquid from the source 165. For example, the pump 110, from a first encapsulated unit 15, can pump the heat transfer liquid from the source 165 through the heat exchanger 120. The heat exchanger 120 can exchange the thermal energy from the heat transfer liquid from the source 165 with the thermal energy from the thermal control loop 160. After exchanging the thermal energy from the heat exchanger 120, the heat transfer liquid from the source 165 can be discharged to a sink 167, removing the thermal energy from the heat exchanger 120. In one or more embodiments, the sink 167 can be the body of water surrounding the heat exchanger 120. In one or more embodiments, the sink 167 can be in fluid communication with other systems and processes, some of which are described herein. The heat transfer liquid from the sink 167 can be used by the other systems and processes for thermal conditioning, as a chemical additive or for other purposes as can be appropriate for the given system or process.

In one or more embodiments, the submersible process environment 300 can be configured to provide thermal conditioning to any one of the one or more encapsulated units 15. In one or more embodiments, the submersible process environment 300 can be configured to provide thermal conditioning to any one of one or more other submersible process environments, some of which are described herein.

Figure 4:
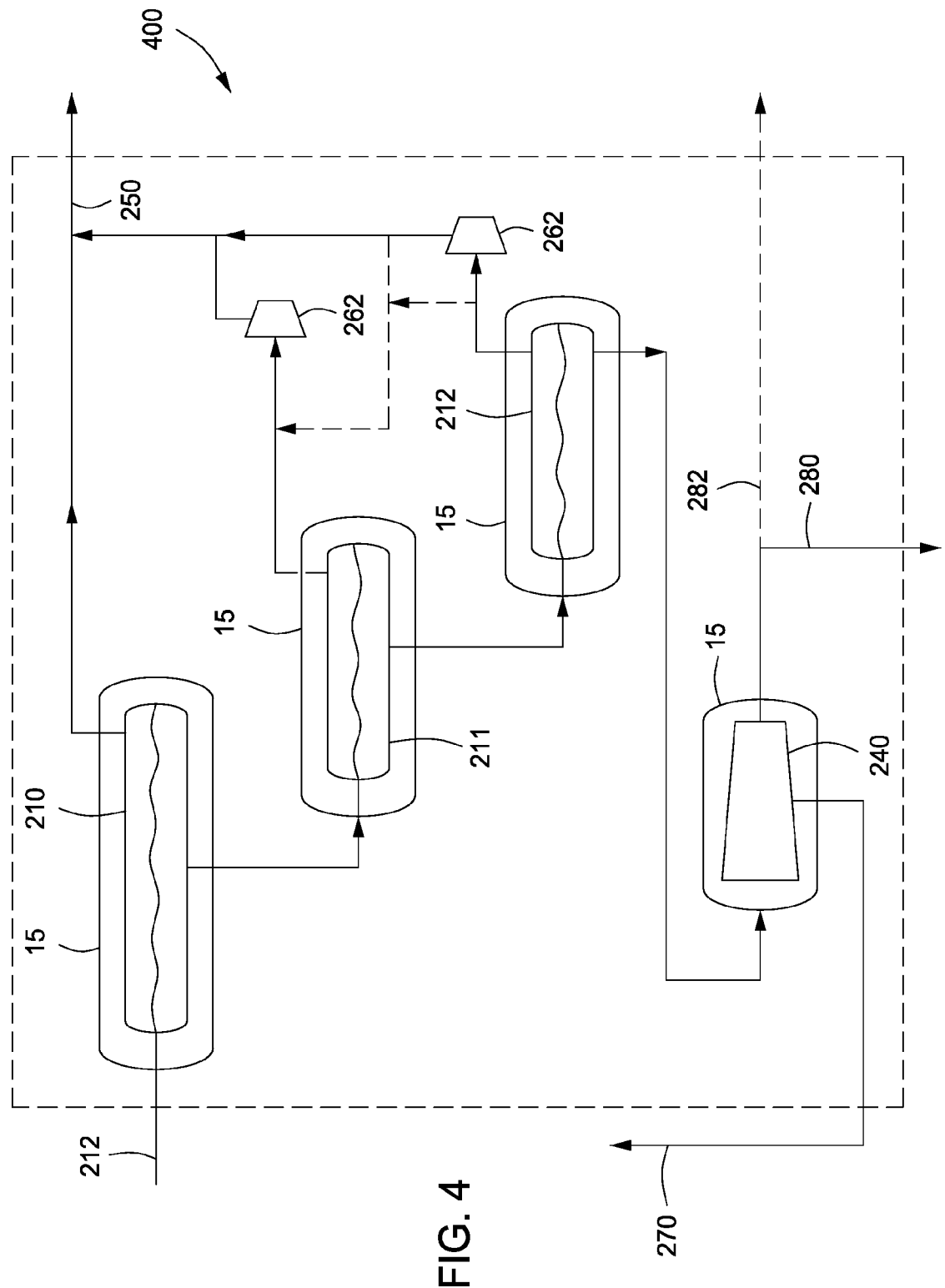
FIG. 4 depicts a schematic of an illustrative submersible process environment for a three phase separation system that employs one or more encapsulated units according to one or more embodiments described.

FIG. 4 depicts a schematic of an illustrative submersible process environment defining a three phase separation system that employs one or more encapsulated units according to one or more embodiments described. The submersible process environment 400 can include at least four encapsulated units 15 in fluid communication with one another. Three encapsulated units 15 can provide a housing for one or more horizontal separators 210, 211, 214 ("processing units"). A fourth encapsulated unit 15 can also provide a housing for a processing unit, such as an oil/water separator 240. The separator 240 can be one or more hydrocyclones, for example.

A multi-phase hydrocarbon can be introduced to the first separator 210 contained with the first encapsulated unit 15 via inlet or stream 212 where gas can be separated from the liquid hydrocarbon. The liberated gas can exit the horizontal separator 210 via stream 250 and the partially degassed hydrocarbon can be transferred to a second horizontal separator 211. Additional gas can be separated from the partially degassed hydrocarbon in the second horizontal separator 211 operating at a lower pressure than the first horizontal separator 210. The additional liberated gas can be transferred to one or more compressors 262 and conveyed to stream 250. The partially degassed hydrocarbon can be transferred to the third horizontal separator 214. The third horizontal separator 214 can operate at an even lower pressure than the first and second 210, 211. The remaining gas can be recovered in the third horizontal separator 214 and transferred to one or more compressors 262 and conveyed to stream 250. The remaining partially processed hydrocarbon can be transferred to the one or more separators 240, for water/hydrocarbon separation. The recovered liquid hydrocarbon can be conveyed via stream 270 to surface ships, pipelines or to another processing system for sub-sea processing as appropriate.

In one or more embodiments, the water liberated from the degasified hydrocarbon can be pumped back into a well, not shown, via stream 280. In one or more embodiments, the water liberated from the degasified hydrocarbon can be discharged through one or more outlets 282 for further purification using a water purification process known in the art to reduce contaminants below about 40 parts per million, the process not shown.

The gas from outlet 250 can be dehydrated, prior to being lifted to the surface, using a sub-sea gas dehydration processing system similar to one or more of the methods or systems described below. In one or more embodiments, the gas from outlet 250 can be sent through a sub-sea sulfur recovery unit (SRU) to remove hazardous hydrogen sulfide ($H_2S$). The gas can also be used for re-injection or gas lift either for subsurface equipment or surface equipment.

Dehydrating a gas, for example a natural gas or a refinery gas, is a conventional operation generally using surface level equipment that controls the dew point of the water in the gas. Such an operation prevents hydrates or ice from forming during transport or use of the gas, and it can also reduce the risk of corrosion. In one or more methods, the gas can be brought into contact with a hydrophilic liquid desiccant. Such desiccants include glycols and polyglycols. Triethylene glycol (TEG) is one of the most widely used desiccants for this purpose because TEG has a high affinity for water, has good chemical stability and has a relatively low cost.

Figure 5:
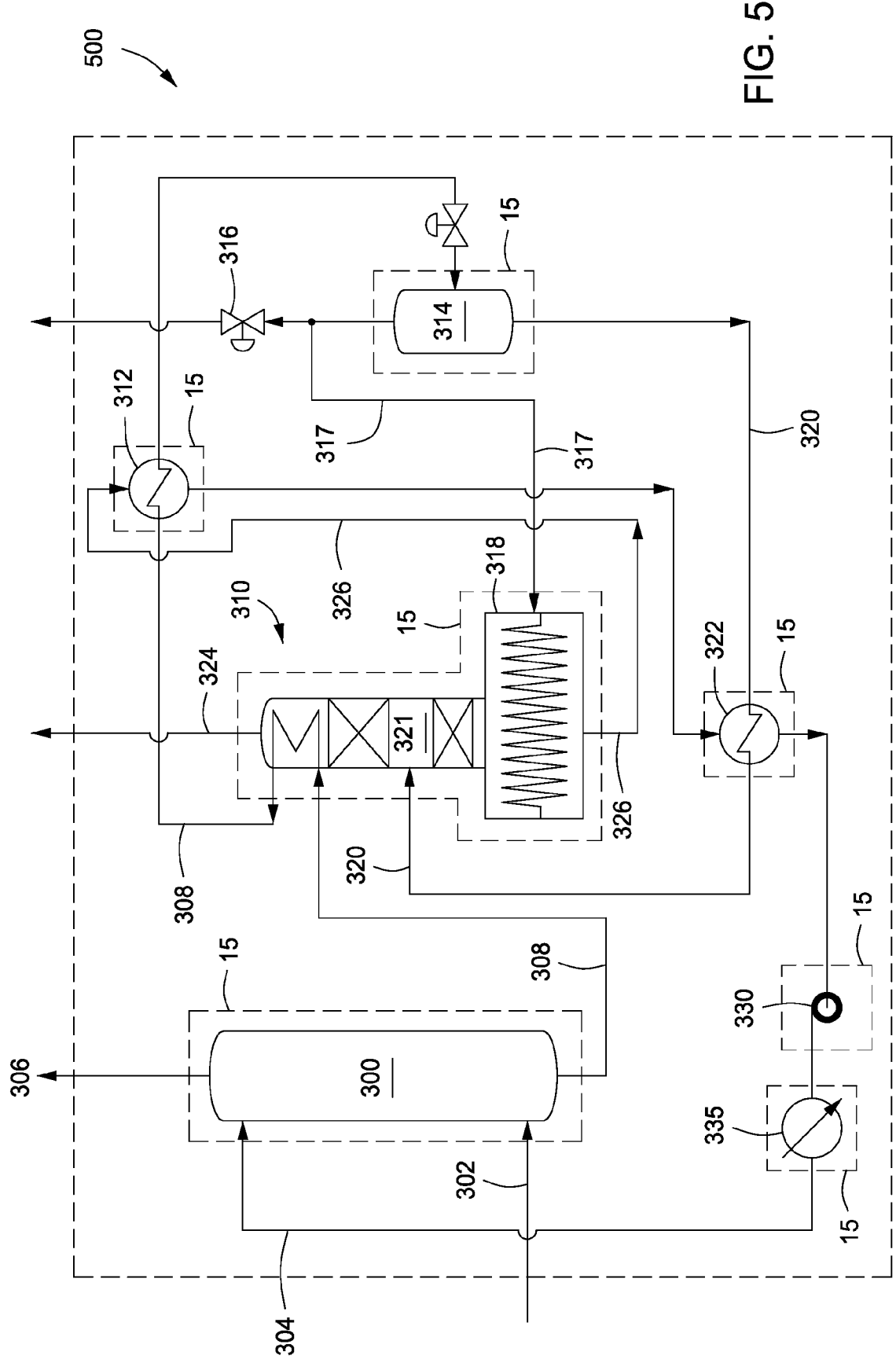
FIG. 5 depicts a schematic of an illustrative submersible process environment for a gas dehydration system that employs one or more encapsulated units according to one or more embodiments described.

FIG. 5 depicts a schematic of an illustrative submersible process environment defining a gas dehydration processing system that employs one or more encapsulated processing units according to one or more embodiments described. The gas dehydration process can include one or more encapsulated units 15 configured to define a dehydration processing system 500. Disposed in one or more encapsulated units 15 can be an absorption column 300, moist gas line 302, overhead line 304, dehydrated gas line 306, desiccant discharge line 308, desiccant regeneration unit 310, heat exchanger 312, flash separation drum 314, directional valve 316, reboiler 318, separation line 320, distillation zone 321, heat exchanger 322, discharge line 324, dehydrated desiccant line 326, pump 330, and chiller 335. In one or more embodiments, moist gas enters the bottom of an absorption column 300 via a moist gas line 302, operating under pressure, where the moist gas comes into contact with a circulating counter-current of liquid desiccant introduced to the overhead via a line 304. During contact, the water contained in the gas can be absorbed by the desiccant. The dehydrated gas leaves the head of the absorption column 300 via a dehydrated gas line 306.

In one or more embodiments, the desiccant charged with water can be sent via a desiccant discharge line 308 to the head of a regeneration unit 310 where the desiccant can be recovered and used as a cooling fluid. For example, the desiccant charged with water can be heated by passing it into a heat exchanger 312, pressurized, and then sent to a flash separation drum 314. In one or more embodiments, it is possible to send the desiccant charged with water first to the flash separation drum 314 before using the desiccant as a cooling fluid at the condensing section of regeneration unit 310. A large portion of the gas absorbed at high pressure by the desiccant during gas dehydration can be separated from the liquid phase in drum 314. The gas can be brought to the surface and further treated, discharged to the sea via a valve 316, or used as a fuel gas for desiccant regenerations.

In one or more embodiments, the liquid desiccant containing water, but separated from the gas absorbed at high pressure, leaves the flash separation drum 314 via a separation line 320. After passing into at least one heat exchanger 322, where the desiccant is re-heated, it can be sent via a line 320 to a distillation zone 321 in the regeneration apparatus 310, in which a portion of the water absorbed by the desiccant can be vaporized and eliminated overhead via a discharge line 324 while regenerated desiccant which leaves the bottom of the reboiler 318 via a dehydrated desiccant line 326 traverses the exchanger 312 then the exchanger 322, in which it is cooled, and sent via a pump 330 to a chiller 335, then to the head of the absorption column 300. In one or more embodiments, if higher regenerated desiccant purity is desired, several stripping techniques known in the art can be employed. In one or more embodiments, all of the components employed in a gas dehydration process, similar to one as described above, can be surface rated components and can be encapsulated to allow sub-sea operations. In one or more embodiments, one or more components can be surface rated and encapsulated to allow sub-sea operations.

Figure 6:
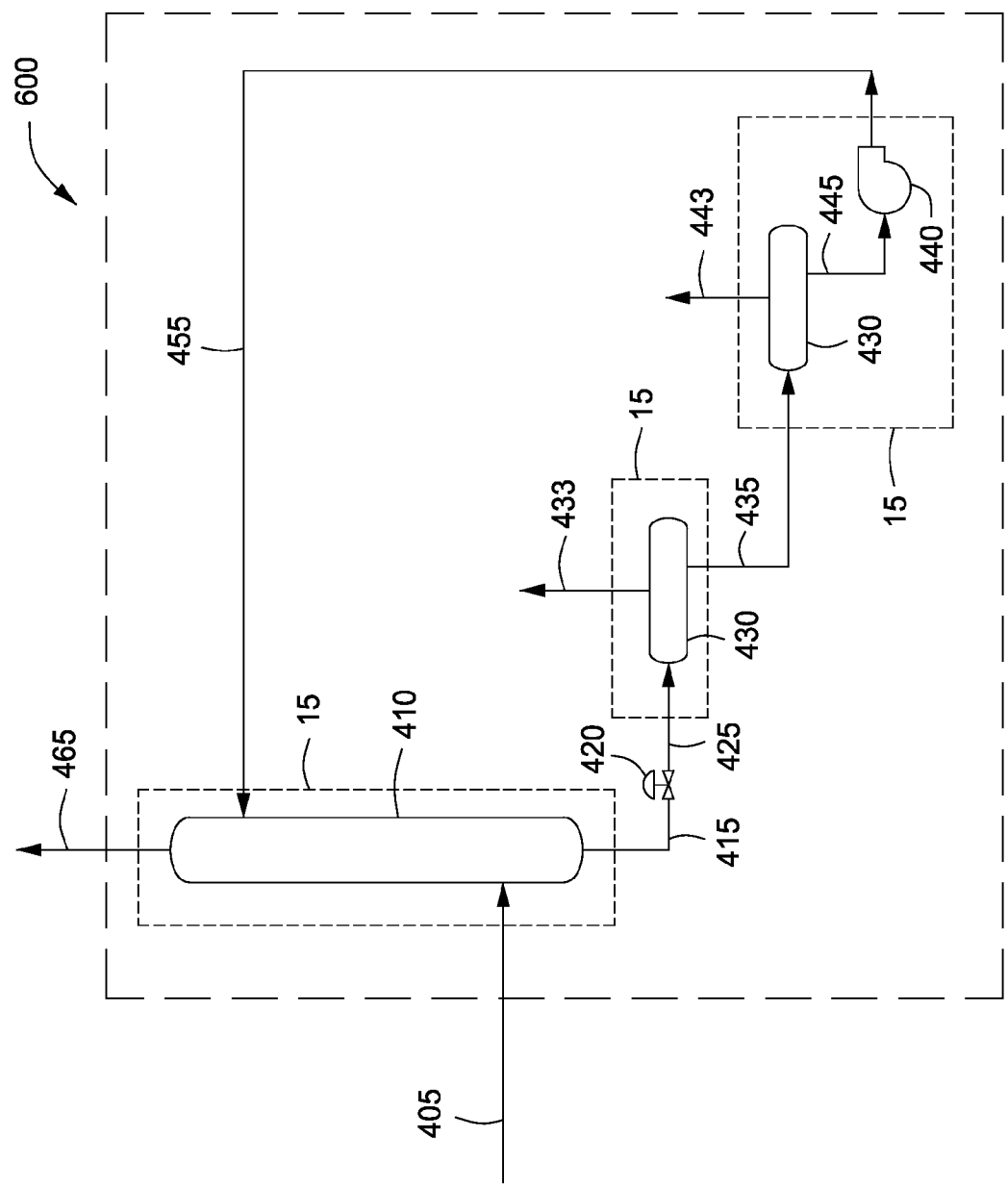
FIG. 6 depicts a schematic of an illustrative submersible process environment for a sulfur removal system that employs one or more encapsulated units according to one or more embodiments described.

FIG. 6 depicts a schematic of an illustrative submersible process environment for a sulfur removal system that employs one or more encapsulated processing units according to one or more embodiments described. The process environment 600 can include one or more encapsulated units 15 configured to define a sulfur recovery unit for hydrotreating, absorption, adsorption, and/or catalytic distillation.

For example, disposed in one or more encapsulated units 15 can be any one or more contactors 410, one or more pressure valves 420, one or more flash separators 430, and one or more recirculation pumps 440 for removing sulfur from an acid gas by absorption. In operation, an acid gas feed stream 405 can be contacted in one or more contactors 410 with a counterflowing lean solvent provided by stream 455. The acid lean solvent can absorb $H_2S$, $CO_2$, COS, $SO_2$, $CS_2$, $H_2O$, or any combinations thereof, from the feed gas stream 405. The acid lean solvent can be or include propylene carbonate, for example. At least the acid lean solvent, enriched in acid gas, can exit the one or more contactors 410 as acid rich solvent stream 415. The feed gas stream, lean in acid gas can exit the one or more contactors 410 as acid free gas stream 465.

The acid rich solvent stream 415 can be flashed through a flash valve 420 to provide a flashed acid rich solvent stream 425. The flashed acid rich solvent stream 425 can be further flashed in one or more flash separators 430 in series or in parallel. If flashed in series, the acid rich solvent stream 425 can be flashed in one or more flash separators 430 to provide a hydrogen sulfide gas stream 433 enriched in hydrogen sulfide and an acid lean solvent stream 435 lean in hydrogen sulfide. The acid lean solvent stream 435 can then be flashed in one or more flash separators 430 to provide an acid lean solvent stream 445 and an acid gas stream 443 enriched in hydrogen sulfide. The acid lean solvent stream 445 can be recirculated to the one or more contactors 410 by one or more recirculation pumps 440.

Although not shown, an encapsulated sand trap can be used to collect sand liberated from the hydrocarbon during processing. The encapsulated sand trap can be removed from the process, brought to the surface and emptied. In one or more embodiments, the encapsulated sand trap can be emptied into a sub-sea sand processing system for sand decontamination. In one or more embodiments, the encapsulated sand trap can be emptied back into a well.

In one or more embodiments, the submersible process environments 10, 300, 400, 500, 600 can be submerged in water and transported to a sub-sea processing location where the encapsulated units 15 can be placed in appropriate fluid or other communication with each other to define a processing system. In one or more embodiments, the encapsulated units 15 can be submerged in water and transported to a sub-sea processing location where the encapsulated units 15 can be placed in appropriate fluid or other communication with each other and/or well heads, valves and auxiliary piping, the entire combination defining the submersible process environment 10, 300, 400, 500, 600. In one or more embodiments, the submersible process environment 10, 300, 400, 500, 600 can be submerged in water and transported to a sub-sea processing location where the encapsulated units 15 can be placed in appropriate fluid or other communication with a processing system already located at the sub-sea processing location. In one or more embodiments, maintenance can be performed on the submersible process environment 10, 300, 400, 500, 600 by removing one or more encapsulated units 15 from the processing system, bringing the encapsulated units 15 to the surface, and performing maintenance on the encapsulated units 15 and/or the processing units 20 disposed within. In one or more embodiments, the submersible process environment 10, 300, 400, 500, 600 can be combined with other submersible process environments 10, 300, 400, 500, 600 to define an alternative processing system.

Specific embodiments can further include submersible process environments for sub-sea processing comprising a modular encapsulated unit having an interior volume and one or more processing units disposed therein, a first valve in fluid communication with the interior and exterior of the unit, and a second valve in fluid communication with the interior and exterior of the unit, wherein the first valve and the second valve are in fluid communication with the processing unit, and wherein the processing unit receives a fluid from the first valve and discharges the fluid to the second valve.

Specific embodiments can further include the submersible process environments discussed above or elsewhere herein and one or more of the following embodiments: wherein the processing unit is a hydrocyclone; wherein the processing unit is a pump; wherein the processing unit is a horizontal separator; wherein the processing unit is a heat exchanger; wherein the first valve is a first encapsulated safety valve circuit, and the second valve is a second encapsulated safety valve circuit; wherein the processing unit is a plurality of processing units, the plurality of processing units are disposed within the interior volume, the first valve and the second valve is in fluid communication with the plurality of processing units, and the plurality of processing units transfer fluid from the first valve to the second valve; and/or further comprising a first plurality and a second plurality of valves, wherein the first plurality and second plurality of valves are in fluid communication with at least one of the plurality of processing units, and wherein the plurality of processing units transfer fluid from at least one of the first plurality of valves to at least one of the second plurality of valves.

Specific embodiments can further include methods for sub-sea processing comprising processing a fluid at a sub-sea location using a submersible process environment comprising a modular encapsulated processing unit having an interior volume, a first valve in fluid communication with the interior and exterior of the unit, a second valve in fluid communication with the interior and exterior of the unit, and a processing unit disposed in the interior volume, wherein the first valve and the second valve is in fluid communication with the processing unit, and wherein the processing unit receives a fluid from the first valve and discharges the fluid to the second valve.

Specific embodiments can further include the methods discussed above or elsewhere herein and one or more of the following embodiments: further comprising a plurality of processing units disposed in the interior volume; further comprising a plurality of modular encapsulated processing units in fluid communication with each other, wherein the combination defines a processing system; wherein the processing system is a two-stage gas, liquid separation processing system; wherein the processing system is a three-stage gas, liquid hydrocarbon, water separation processing system; wherein the processing system is a gas dehydration system; wherein the processing system is a sulfur recovery unit; further comprising a plurality of modular encapsulated processing units in fluid communication each other, wherein the combination defines a thermal conditioning processing system; further comprising an unencapsulated processing unit in fluid communication with the modular encapsulated processing unit, wherein the combination defines a processing system; further comprising a plurality of modular encapsulated processing units in fluid communication with the unencapsulated processing unit, wherein the combination defines a processing system; and/or further comprising a plurality of modular encapsulated processing units, and a plurality of unencapsulated processing units, wherein the plurality of encapsulated units is in fluid communication with the plurality of unencapsulated processing units, and wherein the combination defines a processing system.

Specific embodiments can further include methods for sub-sea processing comprising processing a fluid at a sub-sea location using a submersible process environment comprising a first plurality of modular encapsulated processing units each having an interior volume, a first plurality of processing units, at least one of each being disposed in at least one of each of the first plurality of modular encapsulated processing units, a first plurality of valves in fluid communication with at least one of each of the first plurality of processing units and in fluid communication with at least one of each of the exteriors of the first plurality of modular encapsulated processing units; combining the first plurality of modular encapsulated processing units to define a processing system, a second plurality of modular encapsulated processing units having an interior volume, a second plurality of processing units, at least one of each being disposed in at least one of each of the second modular encapsulated processing units, and a second plurality of valves in fluid communication with at least one of each of the second plurality of processing units and in fluid communication with at least one of each of the exteriors of the second plurality of modular encapsulated processing units; combining the second plurality of modular encapsulated processing units to define a thermal conditioning processing system; and placing the thermal conditioning processing system in thermal communication with at least one of the first plurality of modular encapsulated processing units within the processing system, wherein the thermal conditioning processing system regulates the thermal environment of the first plurality of modular encapsulated processing units.

Certain embodiments and features have been described using a set of numerical upper limits and a set of numerical lower limits. It should be appreciated that ranges from any lower limit to any upper limit can be contemplated unless otherwise indicated. Certain lower limits, upper limits and ranges appear in one or more claims below. All numerical values can be "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention can be devised without departing from the basic scope thereof, and the scope thereof is determined by the claims that follow.

What is claimed is:

1. A submersible process environment for sub-sea processing comprising:
    a modular encapsulated unit having an interior volume and a processing unit disposed therein, wherein the interior volume contains a first blanket gas to provide a controlled processing environment;
    a first safety valve circuit in fluid communication with the processing unit, comprising:
        a first valve; and
        a second valve in fluid communication with the first valve,
        wherein if one of the first and second valves fails open, the other one of the first and second valves will act as backup, such that the first safety valve circuit fails closed; and
    a second safety valve circuit in fluid communication with the processing unit, wherein at least one of the first safety valve circuit and the second safety valve circuit is disposed on an exterior of the encapsulated unit, wherein the second safety valve circuit comprises:
        a third valve; and
        a fourth valve in fluid communication with the third valve,
        wherein if one of the third and fourth valves fails open, the other one of the third and fourth valves will act as backup, such that the second safety valve circuit fails closed, wherein at least one of the first safety valve circuit and the second safety valve circuit is disposed within a closed housing containing a second blanket gas to provide a controlled environment therein.

2. The submersible process environment of claim 1 wherein the processing unit is a hydrocyclone.

3. The submersible process environment of claim 1 wherein the processing unit is a pump.

4. The submersible process environment of claim 1 wherein the processing unit is a horizontal separator.

5. The submersible process environment of claim 1 wherein the processing unit is a heat exchanger.

6. The submersible process environment of claim 1 wherein the first and second safety valve circuits are both disposed on an exterior of the modular encapsulated unit.

7. The submersible process environment of claim 1 wherein the first blanket gas and the second blanket gas are the same or different.

8. A method for sub-sea processing comprising:
    processing a fluid at a sub-sea location using a modular encapsulated unit, wherein the modular encapsulated unit is contained and comprises:
        an interior volume and a processing unit disposed therein, wherein the interior volume contains a first blanket gas to provide a controlled processing environment;
        a first valve in fluid communication with the processing unit, and
        a second valve in fluid communication with the processing unit,
        wherein at least one of the first valve and the second valve is disposed on an exterior of the modular encapsulated unit,
        wherein at least one of the first valve and the second valve is disposed within a closed housing containing a second blanket gas to provide a controlled environment therein; and
    cooling the processing unit of the modular encapsulated unit using a thermal conditioning system.

9. The method of claim 8 wherein the processing unit comprises a plurality of processing units.

10. The method of claim 8 wherein the encapsulated unit comprises a plurality of modular encapsulated units in fluid communication with each other to provide a continuous processing environment.

11. The method of claim 10 wherein the processing unit is a two-stage gas, liquid separation processing system.

12. The method of claim 10 wherein the processing unit is a three-stage gas, liquid hydrocarbon, or water separation processing system.

13. The method of claim 10 wherein the processing unit is a gas dehydration system.

14. The method of claim 10 wherein the processing unit is a sulfur recovery unit.

15. The method of claim 8 wherein the thermal conditioning system comprises a plurality of processing units in fluid communication with each other within the controlled environment of the encapsulated unit.

16. The method of claim 8, wherein an unencapsulated unit is in fluid communication with the modular encapsulated unit to provide a continuous, controlled processing environment.

17. The method of claim 8, wherein a plurality of modular encapsulated units is in fluid communication with an encapsulated unit to provide a continuous, controlled processing environment.

18. The method of claim 8, wherein a plurality of modular encapsulated units are in fluid communication with a plurality of unencapsulated units to provide a continuous, controlled processing environment.

19. The method of claim 8 wherein the first blanket gas and the second blanket gas are the same or different.

20. A submersible process environment for sub-sea processing comprising:
   one or more encapsulated units positioned at a depth underwater, each encapsulated unit having:
      two or more processing units disposed therein, wherein the encapsulated unit contains a first blanket gas to provide a controlled processing environment therein;
      a first safety valve circuit in fluid communication with the two or more processing units,
      a second safety valve circuit in fluid communication with the two or more processing units,
      wherein the first and second safety valve circuits are disposed on an exterior of the encapsulated unit,
      wherein at least one of the first safety valve circuit and the second safety valve circuit is disposed within a closed housing containing a second blanket gas to provide a controlled environment therein, and
      wherein at least one of the two or more processing units is rated for use at surface pressure.

21. The submersible process environment of claim 20 wherein the first and second valve circuits are configured to fail closed.

22. The submersible process environment of claim 20 wherein the first blanket gas and the second blanket gas are the same or different.

* * * * *